Sept. 18, 1962 F. STEINER 3,054,997

ELECTROMAGNETIC AUDIBLE SIGNALLING DEVICE

Filed Dec. 21, 1959 2 Sheets-Sheet 1

*Inventor*

FREDERICK STEINER

*By* Cameron, Kerkam & Sutton

*Attorneys*

Sept. 18, 1962
F. STEINER
3,054,997
ELECTROMAGNETIC AUDIBLE SIGNALLING DEVICE
Filed Dec. 21, 1959
2 Sheets-Sheet 2

INVENTOR
FREDERICK STEINER

BY Cameron, Kerkam & Sutton
ATTORNEYS

United States Patent Office 3,054,997

Patented Sept. 18, 1962

3,054,997

ELECTROMAGNETIC AUDIBLE SIGNALLING DEVICE

Frederick Steiner, Stapleford, Nottingham, England, assignor to Ericsson Telephones Limited, London, England, a British company Filed Dec. 21, 1959, Ser. No. 860,929
Claims priority, application Great Britain Dec. 27, 1958
9 Claims. (Cl. 340—392)

The present invention relates to audible signalling devices and particularly though not exclusively to electric bells such as may be employed in telephone instruments.

Electric bells for use in telephone instruments usually comprise a polarised electromagnet energised from an alternating current source and a striker actuated by an armature arranged to co-operate with the poles of the electromagnet. The minimum power required to operate such an electric bell is usually of the order of fifty to sixty milli-watts and for this reason bells of this kind are not suitable for use in conjunction with electronic telephone exchange apparatus where the power available to operate the bell may be of the order of two or three milli-watts. Whilst it is possible to construct an electromagnet of reduced size which requires proportionately reduced power to operate a scaled down armature, such reduction in size is limited by the necessity to provide an adequate audible warning. It is a disadvantage of known electric bells that should the operating power vary from time to time the armature may fail to operate until the dimensions of air gaps between it and the poles of the electromagnet are suitably adjusted. Furthermore such electric bells are usually operated by an alternating current of relatively low frequency, for example seventeen cycles per second, and when two or more such bells are used on a party line, difficulty may be encountered in causing them to ring separately so that each station on the party line is distinctly signalled.

It is one object of the present invention to provide an audible signalling device which requires electrical operating power of a relatively low order.

It is another object of the invention to provide an audible signalling device which is responsive to an alternating current of a particular frequency or frequencies.

It is a further object of the invention to provide an audible signalling device of relatively simple construction which requires a minimum of adjustment.

With the above and other objects in view the invention provides an audible signalling device comprising a vibratory member having at least a portion formed from magnetic material, electromagnetic exciting means adapted to co-operate with the said vibratory member or with a magnetic portion thereof, and a striker arranged to rest against the vibratory member and adapted to co-operate therewith when the said vibratory member is excited.

Preferably the vibratory member is a dome-shaped member formed wholly or partly from magnetic material.

The striker may be fastened to the free end of a resilient member suitably biased to cause the striker to rest against the vibratory member, or the striker may be fastened to the free end of a flexible or pivoted member biased by gravity to rest against the vibratory member.

In another embodiment the striker may be constrained to co-operate with a suitable part of the vibratory member by gravity alone.

The invention will now be described by way of example with reference to the accompanying drawings in which.

Figure 1:
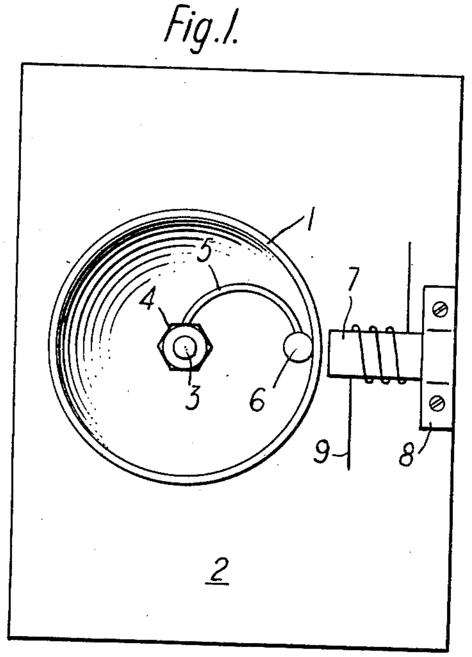
FIGURE 1 shows a plan view of an electric bell embodying the invention.

Referring to FIGURE 1 a dome-shaped vibratory member 1 of mild steel is fastened to a base plate 2 of insulating material with its concave face uppermost, by means of a threaded bolt 3 which passes through a hole in the plate 2, through a central circular hole in the vibratory member 1 and is secured by a threaded nut 4. The dome shape of vibratory member 1 is indicated by the shading lines in FIGURE 1 which also show that the concave face of said member is uppermost. An arcuate resilient member 5 is secured at one end by the nut 4 so that a striker 6 on its free end rests lightly against the inner perimeter of the vibratory member 1. A rectangular electromagnet 7 is fastened to the base plate 2 by a substantially U-shaped metal bracket 8, so that a pole piece of the electromagnet 7 is close to the outer perimeter of the vibratory member 1 adjacent to the position where the striker 6 rests. The winding 9 of the electromagnet 7 is connected to a source of alternating current (not shown) of a suitable frequency, say two hundred cycles per second.

When the electromagnet 7 is energised from the source of alternating current, the vibratory member 1 begins to vibrate at two hundred cycles per second due to the alternate attraction and repulsion of the vibratory member 1 to and from the pole piece of the electromagnet 7. On the first half cycle of alternating current the perimeter of the vibratory member 1 distorts slightly into a shape approximating to an ellipse and on the second half cycle it distorts into another ellipse similar to the first but with the major and minor axes transposed. The striker 6 which before the alternating current was applied to the electromagnet 7 was resting lightly against the inner perimeter of the vibratory member 1 is impelled by the distorted perimeter of the vibratory member 1 so that it moves away therefrom, and is returned to its previous position by the resilience of arcuate member 5. The striker 6 strikes the vibratory member 1 and is impelled again and so on. Thus whilst the electromagnet 7 is energised from the source of alternating current the striker 6 repeatedly strikes the vibratory member 1 and thereby produces an audible signal.

Figure 2:
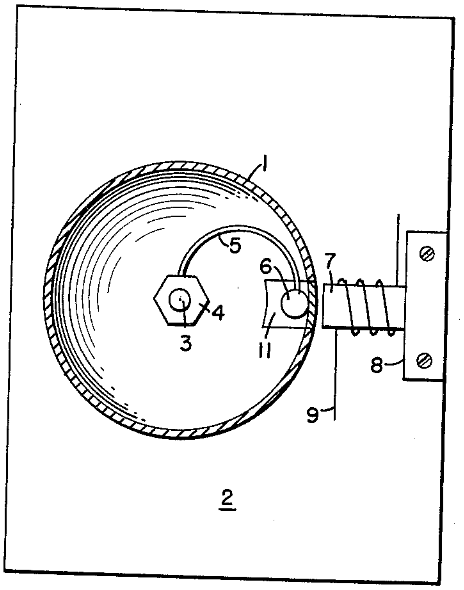
FIGURE 2 is a plan view of a modified form of the bell shown in FIGURE 1 with the upper edge of the vibratory number shown in section.
Figure 3:
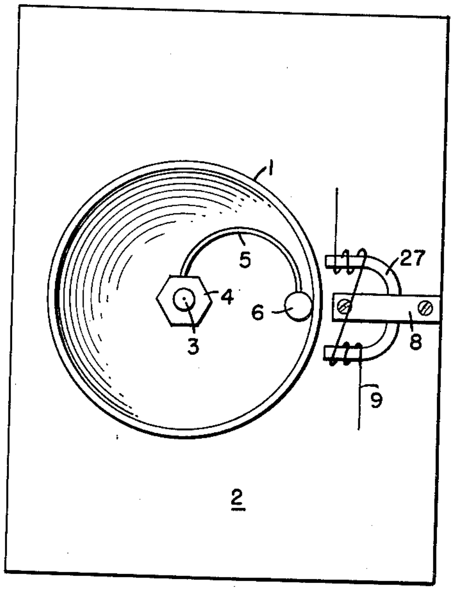
FIGURES 3 and 4 are plan views similar to FIGURE 1 of two other embodiments of the invention.

Although in the embodiment of the invention previously described the vibratory member 1 is dome-shaped, in other embodiments of the invention it may be of any other suitable shape which is capable of emitting a sound when struck repeatedly. It is not necessary that the vibratory member 1 should be formed wholly of magnetic material as previously described, and in other embodiments of the invention the vibratory member 1 may be of non-magnetic material such as brass with a portion of magnetic material attached to or inserted therein, in a position to co-operate with the electromagnet 7. For example, FIGURE 2 shows a bell of the same construction as that illustrated in FIGURE 1 except that the vibratory member 1, the major portion of which is formed from brass, is provided with an insert 11 of magnetic material positioned opposite the electromagnet 7.

In other embodiments of the invention the striker 6 may be fastened to the free end of a flexible or suitably pivoted member, so that it rests against the perimeter of the vibratory member 1 when unoperated, due to the force exerted by gravity.

Figure 4:
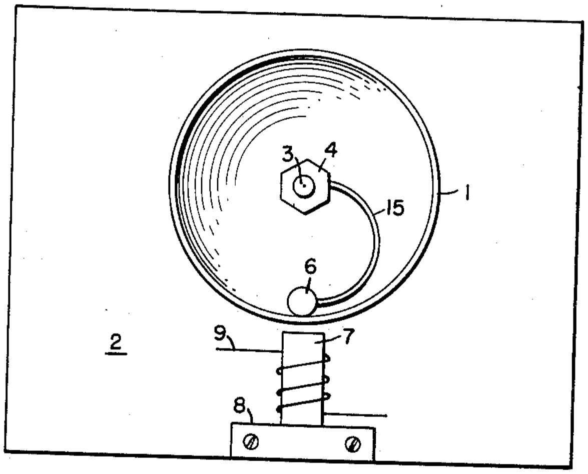

As shown in FIGURE 4, it is preferable to use a U-shaped magnet 27, instead of a bar magnet like that illustrated in FIGURE 1, since this gives an improved magnetic circuit, and the efficiency of the device is improved by the introduction of permanent magnetic flux into the magnetic circuit.

Figure 5:
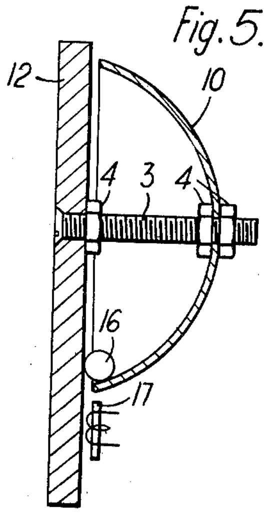
FIGURE 5 shows a vertical section through another embodiment of the invention.

Referring to FIGURE 5, in another embodiment of the invention, we provide a substantially dome-shaped vibratory member 10 secured with its concave surface toward a vertical base plate 12 by a bolt 3 and nuts 4. The periphery of the dome does not touch the base-plate 12, but is sufficiently close thereto to retain within the dome a steel ball 16, which forms the striker. An electromagnet 17 is arranged to co-operate with the vibratory member 10 in substantially the same way as has been described with reference to FIGURE 1.

In operation the device of FIGURE 5 functions in the same way as that of FIGURE 1 but the striker is constrained by gravity instead of by a spring.

It is a feature of the invention that the vibratory member 1 may have a suitable mechanical resonant frequency so that it may be excited by and respond to alternating current of a particular frequency applied to the windings of the electromagnet.

An audible signalling device having a dome-shaped vibratory member two inches in diameter produces a satisfactory audible signal when excited by an electromagnet having a power supply of substantially two milli-watts, and will continue to operate when the power supply is reduced to one milli-watt or increased to twenty milli-watts.

What is claimed is:

1. An audible signalling device comprising a vibratory member having at least a portion thereof formed from magnetic material, electromagnetic exciting means adapted to co-operate with a magnetic portion of said vibratory member to cause said member to vibrate when said exciting means are electrically energised, and a movable striker normally resting against the vibratory member and adapted to be repeatedly driven away from and returned into striking contact with said vibratory member when the latter is excited.

2. A device in accordance with claim 1 in which the striker is carried by and constrained against the vibratory member by a spring.

3. A device in accordance with claim 1 in which the striker is caried on a pivoted member and is constrained against the vibratory member by a spring.

4. A device in accordance with claim 1 in which the striker is constrained against the vibratory member by gravity.

5. A device according to claim 4 in which the vibratory member is a dome-shaped member.

6. A device according to claim 1 in which the vibratory member is formed wholly from magnetic material.

7. A device according to claim 1 in which the vibratory member is formed partly from non-magnetic material and partly from magnetic material.

8. A device according to claim 1 including a bi-polar electromagnet both poles of which co-operate with the said vibratory member.

9. A device according to claim 1 in which the electromagnetic exciting means includes a permanent magnet.

References Cited in the file of this patent

UNITED STATES PATENTS

| | | |
|---|---|---|
| 1,009,345 | Sauve | Nov. 21, 1911 |
| 2,412,610 | Gent | Dec. 17, 1946 |

FOREIGN PATENTS

| | | |
|---|---|---|
| 639,518 | France | Mar. 10, 1928 |